United States Patent [19]

Kakegawa

[11] Patent Number: 5,572,233

[45] Date of Patent: Nov. 5, 1996

[54] DATA STORAGE APPARATUS CAPABLE OF SEARCHING AND DISPLAYING CHARACTER DATA ACCORDING TO CORRESPONDING PICTORIAL SYMBOL DATA

[75] Inventor: Satoru Kakegawa, Kawagoe, Japan

[73] Assignee: Casio Computer Co., Ltd., Tokyo, Japan

[21] Appl. No.: 319,162

[22] Filed: Oct. 6, 1994

[30] Foreign Application Priority Data

Oct. 14, 1993 [JP] Japan ................................. 5-256961

[51] Int. Cl.⁶ ................................................ G09G 5/40
[52] U.S. Cl. .................... 345/116; 345/189; 345/192; 395/788
[58] Field of Search ............................. 395/162–166, 395/156, 159, 600; 345/146, 116, 24, 192, 189; 364/400, 419.19

[56] References Cited

U.S. PATENT DOCUMENTS 5,307,086  4/1994  Griffin et al. ....................... 345/146
5,457,476  10/1995  Jenson ............................... 345/146

OTHER PUBLICATIONS

"Casio Executive B.O.S.S. SF-9500 Hand-Held Computer" by Crystal Waters, Home Office Computing, V9, N4, Apr. 1991.

Primary Examiner—Kee Mei Tung
Attorney, Agent, or Firm—Frishauf, Holtz, Goodman, Langer & Chick

[57] ABSTRACT

A data storage apparatus has a data memory for storing schedule data. The schedule data includes date data, schedule contents data and pictorial symbol data representing schedule contents. When the schedule data is searched, pictorial symbols are read out from the schedule data stored in the data memory and the read-out pictorial symbols are displayed. If one of the displayed pictorial symbols is selected, the schedule data associated with the selected pictorial symbol is read out and displayed.

9 Claims, 5 Drawing Sheets

DATA STORAGE APPARATUS CAPABLE OF SEARCHING AND DISPLAYING CHARACTER DATA ACCORDING TO CORRESPONDING PICTORIAL SYMBOL DATA

BACKGROUND OF THE INVENTION

1. Field of the Invention

The present invention relates to a data storage apparatus for storing data relating to a personal schedule, etc. and displaying the data when necessary.

2. Description of the Related Art

In a conventional electronic memory apparatus such as a personal electronic notebook, data such as schedule data, which is stored in an internal memory by a user's key input in advance, is searched in the following manner.

A desired date is input by a character key operation and a "Search" key is operated. Thus, date data corresponding to the input date is searched in the memory and schedule data associated with the searched date data is displayed.

If a part of schedule data is input as a keyword by a character key operation and the "Search" key is operated, the schedule data is searched and displayed along with an associated stored date.

Accordingly, in the conventional electronic notebook, it is necessary to input, as data to be searched, characters serving as a keyword in a pre-registered data base. Thus, a time-consuming key input operation needs to be performed.

Furthermore, in the conventional electronic notebook, when one wishes to know an outline of schedule data registered as a data base, he/she needs to read and display the data base itself. As a result, an operation similar to that for a normal data search must be executed.

SUMMARY OF THE INVENTION

The present invention has been made in consideration of the above problems, and its object is to provide a data storage apparatus capable of making it possible for a user to understand an outline of registered data and easily search desired data, without the need to execute time-consuming key input operations such as a character input operation, etc.

According to an aspect of the present invention, there is provided a data storage apparatus comprising:

a data memory for storing data;

input means for inputting data containing a special symbol into the data memory;

first display means, operated at a time of data search, for displaying the special symbols associated with the data stored in the data memory;

selection means for selecting one of the displayed special symbols; and second display means for displaying the data read from the data memory in response to the special symbol selected by the selection means.

According to another aspect of the invention there is provided a data storage apparatus comprising:

a schedule data memory for storing schedule data including date data, schedule contents data and a special symbol data representing the schedule contents;

a mode selector for setting one of operation modes including a schedule mode and a calendar mode;

first means, operation in the schedule mode, for searching all special symbol data from the schedule data memory when a data search is executed, and displaying the special symbol data included in the schedule data; and second means, operated in the calendar mode, for reading out special symbol data from the schedule data associated with a specified date and displaying the read-out special symbol data with a calendar in which the specified date is indicated.

According to still another aspect of the invention, there is provided a calendar display apparatus comprising:

a schedule data memory for storing schedule data including date data, schedule contents data and special symbol data representing the schedule contents;

calendar display means for displaying a calendar;

a day indicator indicating a specified date on the displayed calendar; and display means for displaying special symbol data included in the schedule data corresponding to the specified date indicated by the day indicator.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

DETAILED DESCRIPTION OF THE PREFERRED EMBODIMENTS

Figures 1, 2:
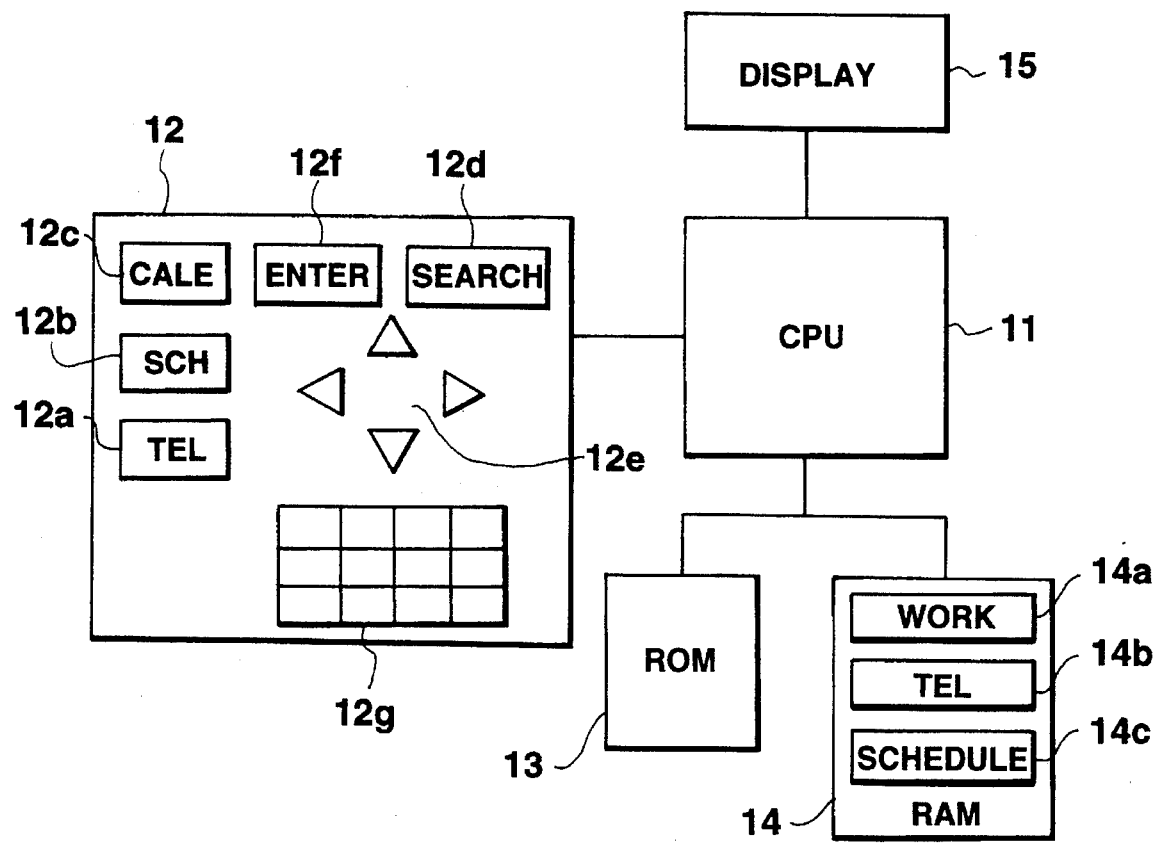
FIG. 1 is a block diagram showing a structure of an electronic circuit of an electronic notebook having a data storage apparatus according to an embodiment of the present invention.
FIG. 2 shows a data storage state of a schedule data registration area defined in a RAM of the electronic notebook having the data storage apparatus.

FIG. 1 is a block diagram showing the structure of an electronic circuit of an electronic notebook in which a data storage apparatus of the present invention is provided.

This electronic notebook has a CPU (Central Processing Unit) 11.

The CPU 11 controls operations of circuit parts according to various function execution programs prestored in a ROM 13, on the basis of a key input signal entered from a key input unit 12. The CPU 11 is connected to a RAM 14 and a liquid-crystal display 15, as well as to the key input unit 12 and the ROM 13.

The key input unit 12 includes "Tel" key 12a for setting a telephone mode, "Sch" key 12b for setting a schedule mode and a "Cale" key 12c for setting a calendar mode. In addition, the key input unit 12 includes a "Search" key 12d for searching registered data, cursor keys 12e for selecting data displayed on the display 15, and an "Enter" key 12f for executing various designated functions.

The key input unit 12 further includes a character key group 12g for inputting telephone data, schedule data, etc.

In the RAM 14, the following areas are defined: a work area 14a for temporarily storing process data at the time of executing various functions; a telephone data registration area 14b for storing personal data including names, addresses, telephone numbers, etc.; and a schedule data registration area 14c for storing schedule data including dates, times, schedule content, etc.

Figure 3:
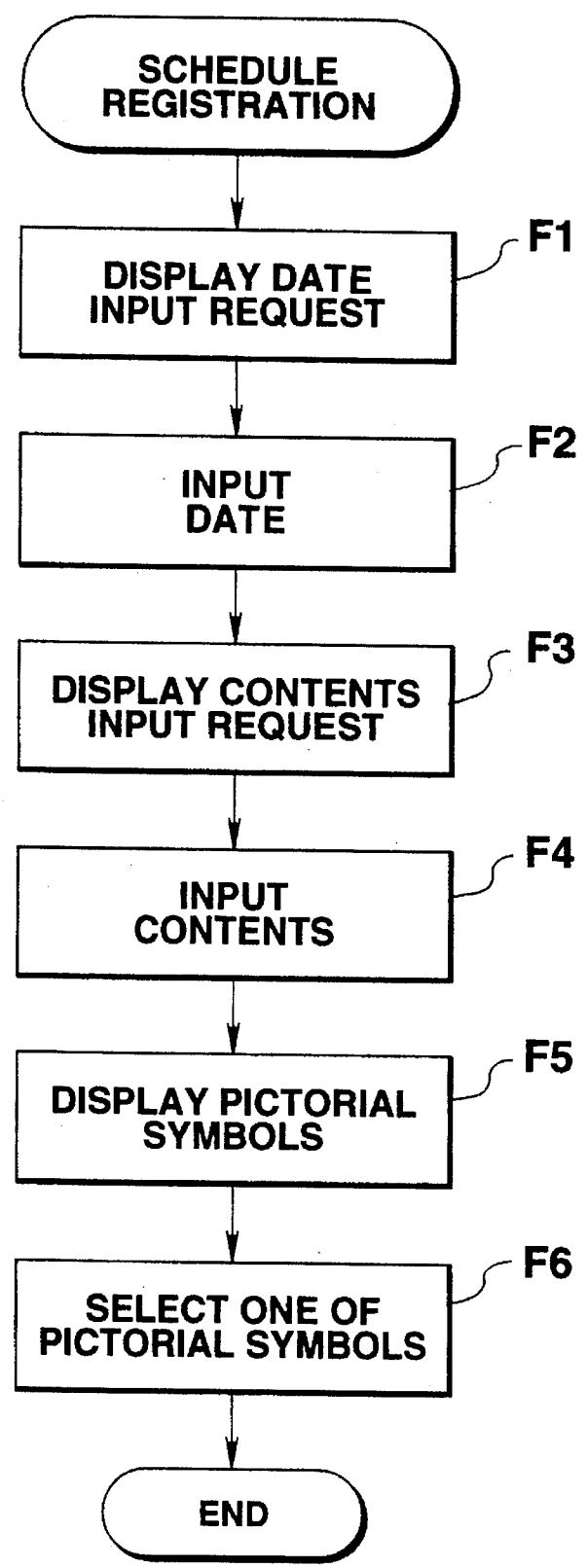
FIG. 3 is a flowchart illustrating a schedule registration process.

FIG. 2 shows a data storage state of the schedule data registration area 14c defined in the RAM 14. The schedule data registration area 14c has a date registration area 16, a pictorial symbol registration area 17, and a data registration area 18, and the respective areas store schedule data of associated items. A data registration process for registering data in the schedule data registration area is carried out according to a flowchart shown in FIG. 3 in the state in which a schedule mode has been set by the operation of the "Sch" key 12b.

In the schedule registration process, a date input request with a message "Date?" is displayed (step F1). In reply to the message, date data is input by operating numerical keys of the character key group 12g (step F2). Then, a schedule contents input request with a message "Schedule?" is displayed (step F3). In reply, schedule contents are input (step F4). Subsequently, various kinds of pictorial symbols prestored in the ROM 13 are displayed, and a pictorial character input is requested (step F5).

The user operates the cursor keys 12e, designates a desired pictorial symbol, and depresses the "Enter" key 12f. Thus, the designated pictorial symbol is input (step F6). The pictorial symbols represent visually the items of "leisure", "meals", "events" (e.g. concerts), etc.

If the above data has been input, date data associated with schedule items are registered in the date registration area 16 of the schedule area 14c in the RAM 14 by character key input operations, and schedule contents associated with the dates are registered in the data registration area 18 by character key input operations. Further, the inputted pictorial symbols are registered in the pictorial symbol registration area 17.

Since the pictorial symbols are registered as one item of schedule data, the schedule data is classified and managed by the pictorial symbols.

The operation of the electronic notebook having the above-described data storage apparatus will now be described.

Figure 4:
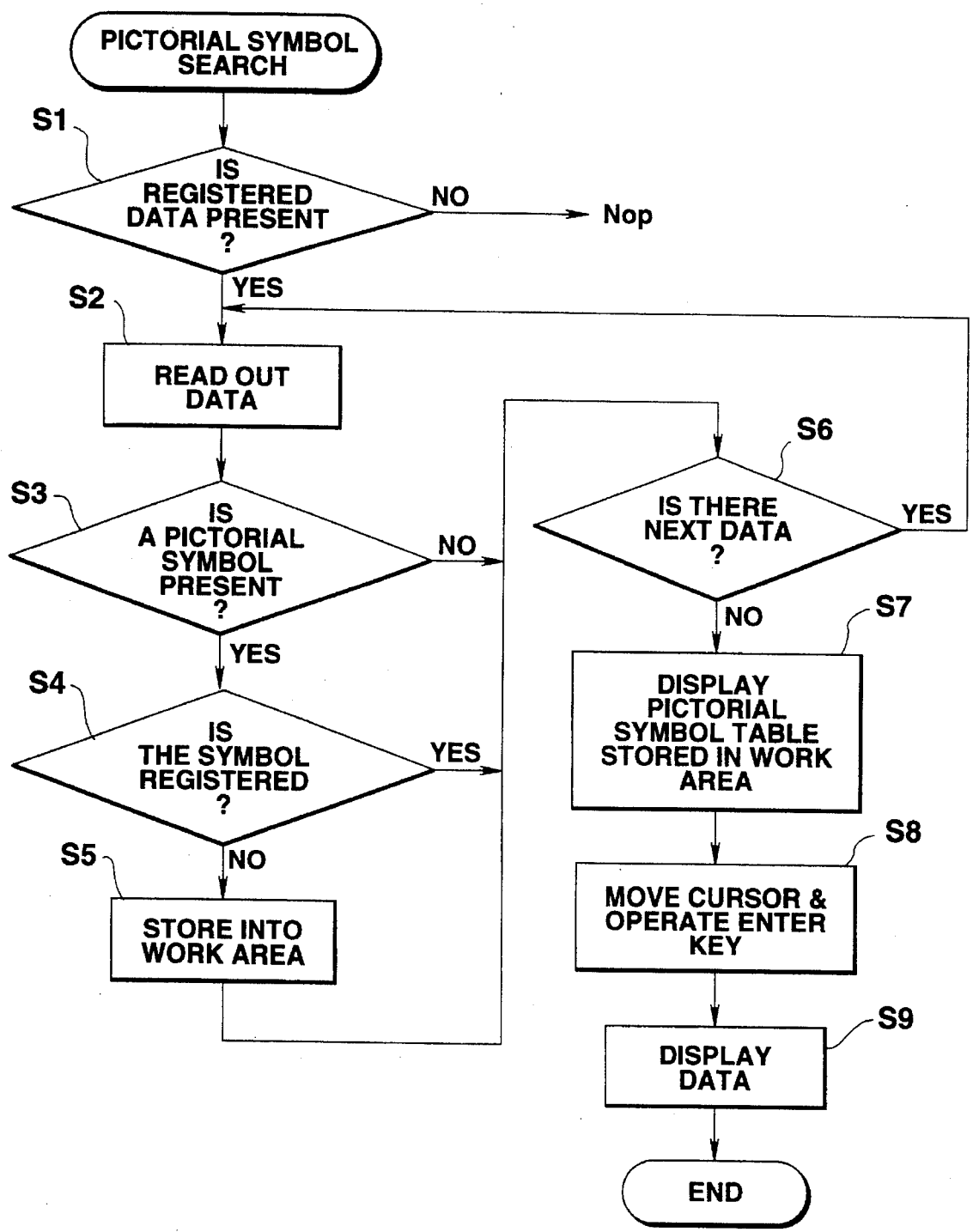
FIG. 4 is a flowchart illustrating a pictorial symbol search process in the electronic notebook having the data storage apparatus.

When schedule data is searched, the "Sch" key 12b on the key input unit 12 is operated to set the schedule mode. Then, the "Search" key 12d is operated and a search process using pictorial symbols is initiated, as shown in FIG. 4. At first, the CPU 11 determines whether schedule data is present in the schedule data registration area 14c defined in the RAM 14 (step S1).

If "Yes" in step S1, i.e. if it is determined that schedule data is already registered in the schedule data registration area 14c of the RAM 14, the schedule data is read out successively from a top data unit by the CPU 11 (step S2). Then, it is determined whether or not pictorial symbol data associated with the schedule data has been registered in the pictorial symbol registration area 17 (step S3). If the pictorial symbol data has been registered, it is determined whether or not the pictorial symbol data has already been stored in the work area 14a of the RAM 14 (step S4). If the pictorial symbol data has not been stored, the pictorial symbol data is stored in the work area 14a (step S5). Therefore only different pictorial symbol data units are stored in the work area of the RAM 14.

For example, if schedule data as shown in FIG. 2 is registered in the RAM 14, pictorial symbol data for "leisure" consisting of an image of golf, pictorial symbol data for "concert" consisting of an image of a piano and pictorial symbol data for "drinking" consisting of an image of a cocktail are stored successively in the work area 14a of the RAM 14.

Figure 6A:
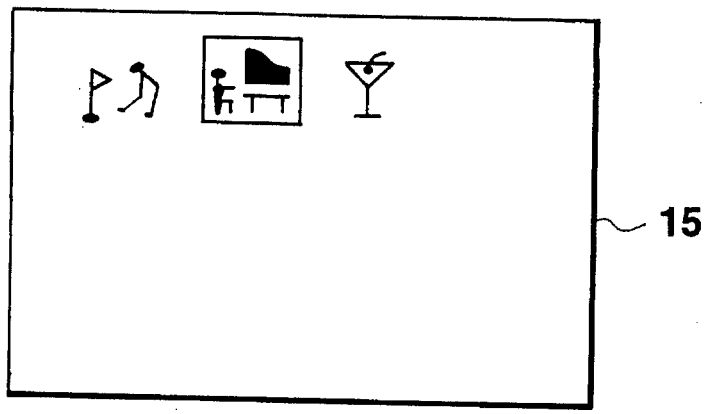
FIGS. 6A, 6B and 6C show display states associated with the schedule data search operation in the electronic notebook having the data storage apparatus.

If the pictorial symbol data search/storage process for all schedule data registered in the schedule data registration area 14c is completed, various kinds of pictorial symbol data stored in the work area 14a of the RAM 14 are read out by the CPU 11 and is all displayed on the liquid-crystal display 15, as shown in FIG. 6A, in the form of a pictorial symbol pattern for "leisure", a pictorial symbol pattern for "concert" and a pictorial symbol pattern for "drink" (steps S6–S7).

By displaying all pictorial symbol patterns registered in the schedule data registration area 14c, the user can recognize which kinds of schedule data has been registered, i.e. the outline of the registered schedule.

If the user selects the kind of schedule which he/she wishes to know, for example, the pictorial symbol pattern for "concert", on the liquid-crystal display 15 by operating the cursor keys 12e and the user operates the "Enter" key 12f, then all concert schedule data units, "93.9.5 NJ HALL", "93.10.3 ABC THEATER", registered in the date registration area 16 and data registration area 18 associated with all pictorial symbol data for "concert" registered in the pictorial symbol registration area 17 in the RAM 14 are read out. The read-out data units are displayed on the liquid-crystal display 15, as shown in FIG. 6B (steps S8 and S9).

Figure 6B:
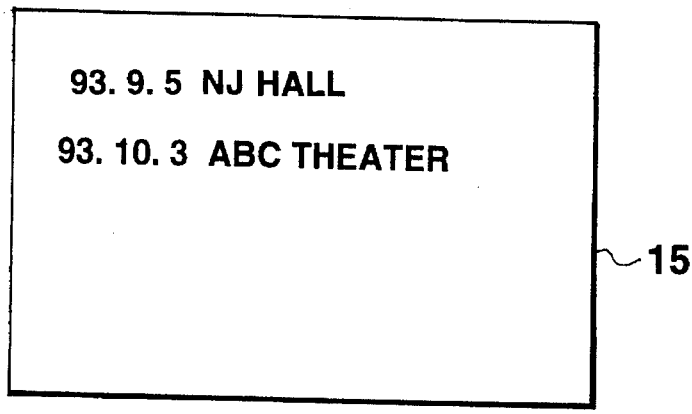

The user is able to know necessary schedule data only by selecting the pictorial symbol pattern representing the kind of desired schedule among the various pictorial symbol patterns display on the liquid-crystal display 15, as is shown in FIGS. 6A and 6B.

A calendar display process will now be described.

Figure 5:
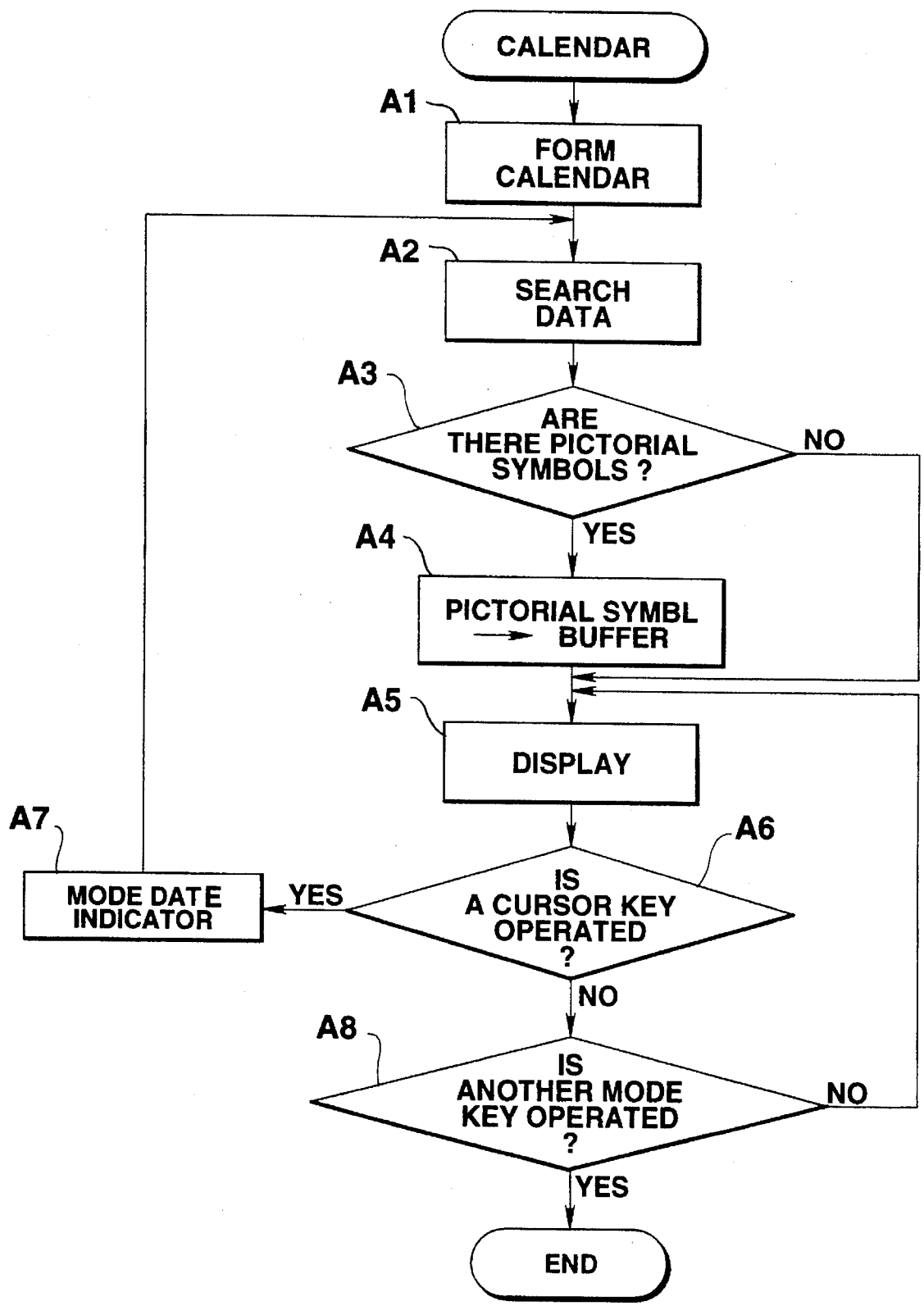
FIG. 5 is a flowchart illustrating a calendar display process in the electronic notebook having the data storage apparatus.
Figure 6C:
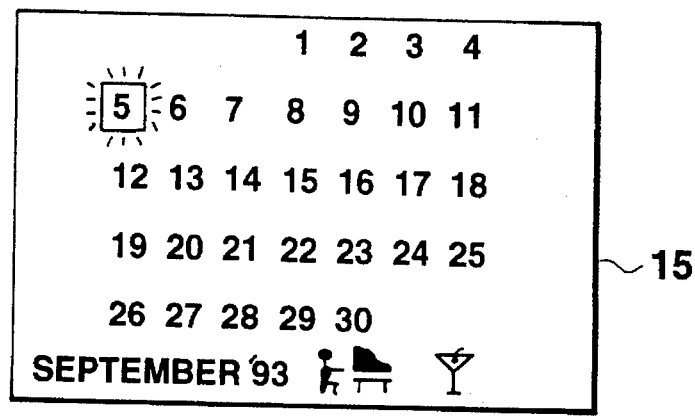

The "Cale" key 12c on the key input unit 12 is operated to set the calendar mode. Thus, a process illustrated in FIG. 5 is executed. Calendar data (September 1993 in the present embodiment) corresponding to the present month is read out from ROM 13 in accordance with the operation of a timer built in the CPU 11 and displayed on the liquid-crystal display 15, as shown in FIG. 6C. A date corresponding to the present day ("5" in this case) is indicated in a reverse display mode (step A1).

Subsequently, the pictorial symbol registration area 17 associated with the data unit "September 5, 1993" is accessed, and the pictorial symbol data units registered in the pictorial symbol registration area 17 (in this case, the pictorial symbol for "concert" and the pictorial symbol for "drink") are read out to the work area 14a in the RAM 14 (steps S2–S4).

As is shown in FIG. 6C, the pictorial symbol pattern for "concert" and the pictorial symbol pattern for "drink" are displayed and the date of "September 5, 1993" is indicated in the reverse display mode (step S5).

Accordingly, the user can know the registered schedule associated with the date by displayed pictorial symbols on the calendar displayed on the liquid-crystal display 15.

If the cursor keys 12e are operated (step A6), the indicator (reversed display) is moved (step A7). When another date is designated by moving the cursor keys 12e, a pictorial symbol associated with the schedule of that date is displayed. If another mode key is depressed, the calendar display is completed (step A8).

In the above-mentioned embodiment, the displayed pictorial symbol or the date in the calendar is designated by moving the cursor. According to the gist of the present invention, a transparent tablet may be provided on the liquid-crystal display 15 so that the displayed pictorial symbol or the date in the calendar can be designated by touching the symbol or the calendar date through the transparent tablet.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A data storage apparatus comprising:

a display;

a data memory;

input means for inputting into said data memory character data and pictorial symbol data for graphically representing associated character data;

data search command input means for causing the character data stored in said data memory to be searched; and a processor, responsive to said data search command input means, for performing the steps of:
    a) reading out all pictorial symbol data associated with the character data stored in said data memory;
    b) simultaneously displaying pictorial symbols on said display corresponding to the read out pictorial symbol data in order to prompt a user to select a displayed pictorial symbol;
    c) reading out character data associated with the selected pictorial symbol; and
    d) displaying the read out character data on said display.

2. The data storage apparatus according to claim 1, wherein:

said data memory includes a schedule data storage area; and said input means includes means for inputting as character data items of schedule data, date data, and schedule contents data, and means for inputting pictorial symbol data for graphically representing associated schedule data, date data, and schedule contents data.

3. The data storage apparatus according to claim 2, further comprising a temporary storage memory; and wherein said processor performs the further steps of writing the read out pictorial symbol in said temporary storage memory and disabling the writing step when the read out pictorial symbol data is the same as pictorial symbol data that has already been written in said temporary storage memory.

4. A calendar display apparatus comprising:

a schedule data memory for storing schedule data including date data, schedule contents data associated with the date data, and pictorial symbol data for graphically representing the schedule contents;

display means having a first area for displaying a calendar and a second area for displaying pictorial symbols corresponding to the pictorial symbol data;

a day indicator for indicating a specified date on the displayed calendar displayed on said first area of said display means, the day indicator being movable on the displayed calendar from one specified date to another date in response to an operation of a user; and control means for causing said second area of said display means to display pictorial symbols graphically representing the schedule contents data associated with the date data corresponding to the specified date indicated by said day indicator.

5. The data storage apparatus according to claim 4, further comprising a key operable by a user to operate said day indicator.

6. The data storage apparatus according to claim 4, further comprising:

an instruction key which is operable to instruct movement of said day indicator; and means for moving said day indicator in response to an instruction of said instruction key.

7. A data storage apparatus comprising:

a display;

a data memory;

input means for inputting into said data memory character data and pictorial symbol data for graphically representing associated character data;

data search command input means for causing the character data stored in said data memory to be searched;

means, responsive to said data search command input means, for reading out all pictorial symbol data associated with the character data stored in said data memory;

means for simultaneously displaying pictorial symbols on said display corresponding to the read out pictorial symbol data in order to prompt a user to select a displayed pictorial symbol;

means for reading out character data associated with the selected pictorial symbol; and means for displaying the read out character data on said display.

8. The data storage apparatus according to claim 7, wherein:

said data memory includes a schedule data storage area; and said input means includes means for inputting as character data items of schedule data, date data, and schedule contents data, and means for inputting pictorial symbol data graphically representing associated schedule data, date data, and schedule contents data.

9. The data storage apparatus according to claim 8, further comprising:

a temporary storage memory;

writing means for writing the read out pictorial symbol in said temporary storage memory; and means for disabling the writing means when the read out pictorial symbol data is the same as pictorial symbol data that has already been written in said temporary storage memory.

\* \* \* \* \*